(12) United States Patent
Beadle et al.

(10) Patent No.: US 8,768,311 B2
(45) Date of Patent: Jul. 1, 2014

(54) INTELLIGENT ASYMMETRIC SERVICE DENIAL SYSTEM FOR MOBILE CELLULAR DEVICES AND ASSOCIATED METHODS

(75) Inventors: Edward R. Beadle, Melbourne, FL (US); John F. Dishman, Melbourne, FL (US); Walter Divito, Satellite Beach, FL (US)

(73) Assignee: Harris Corporation, Melbourne, FL (US)

( * ) Notice: Subject to any disclaimer, the term of this patent is extended or adjusted under 35 U.S.C. 154(b) by 1151 days.

(21) Appl. No.: 11/380,519

(22) Filed: Apr. 27, 2006

(65) Prior Publication Data
US 2007/0254632 A1   Nov. 1, 2007

(51) Int. Cl.
*H04M 3/42* (2006.01)
*H04M 1/725* (2006.01)
*H04M 1/663* (2006.01)
*H04W 48/02* (2009.01)
*H04W 84/04* (2009.01)

(52) U.S. Cl.
CPC .......... *H04M 1/72577* (2013.01); *H04W 48/02* (2013.01); *H04M 1/663* (2013.01); *H04W 84/045* (2013.01)
USPC ..... 455/414.1; 455/403; 455/411; 455/422.1; 455/456.4; 455/561

(58) Field of Classification Search
CPC ... H04W 84/045; H04W 48/02; H04W 8/005; H04W 16/16; H04W 68/00; H04M 1/663; H04M 1/72577
USPC .............. 455/456.4, 422.1, 403, 7, 13.1, 561, 455/414.1, 411
See application file for complete search history.

(56) References Cited

U.S. PATENT DOCUMENTS

| 6,438,385 | B1* | 8/2002 | Heinonen et al. | 455/456.4 |
| 6,907,254 | B1 | 6/2005 | Westfield | 455/456.4 |
| 2003/0143943 | A1* | 7/2003 | Kline | 455/1 |
| 2004/0147287 | A1* | 7/2004 | Nelson et al. | 455/561 |
| 2005/0239482 | A1* | 10/2005 | Fan et al. | 455/456.4 |
| 2005/0282559 | A1* | 12/2005 | Erskine et al. | 455/456.4 |

(Continued)

FOREIGN PATENT DOCUMENTS

WO    2004/089021    10/2004 ............... H04Q 7/38

OTHER PUBLICATIONS

Internet article on Cell Phone Jamming by David Bennahum, pp. 1-3; http://www.cellphonejamming.info.
Internet article on Media Solutions © Iceberg Systems Limited, p. 1; www.icebergsystems.net/safe_haven.

(Continued)

*Primary Examiner* — Charles Appiah
*Assistant Examiner* — Jaime Holliday
(74) *Attorney, Agent, or Firm* — Allen, Dyer, Doppelt, Milbrath & Gilchrist, P.A.

(57) ABSTRACT

The system and method prevents reception of calls to a mobile cellular device within a relatively small area or zone, with minimal inconvenience to the public by also permitting outgoing transmissions. The mobile cellular device has a wirelessly settable parameter associated therewith enabling establishment of an inbound call. A selective call blocker includes a receiver, a transmitter, and a selective call blocking controller cooperating with the receiver to determine the wirelessly settable parameter. The selective call blocking controller also cooperates with the transmitter to wirelessly change the wirelessly settable parameter to selectively block an inbound call to the mobile cellular device and without defeating the capability of the mobile cellular device to establish an outbound call.

20 Claims, 3 Drawing Sheets

(56) References Cited

U.S. PATENT DOCUMENTS

| | | |
|---|---|---|
| 2006/0003703 A1* | 1/2006 | Yahagi ............................ 455/69 |
| 2006/0003747 A1* | 1/2006 | Kolakowski ................ 455/414.1 |
| 2006/0223451 A1* | 10/2006 | Posamentier ................... 455/73 |
| 2007/0218949 A1* | 9/2007 | Cleveland ..................... 455/561 |

OTHER PUBLICATIONS

Web article by Cell Block Technologies, Inc. on "Controlling Wireless Abuse in Restricted Area", pp. 1-2; www.cell-block-r.com.

Internet article: "The Register—Biting the hand that feeds it" by Tony Smith published Aug. 27, 2003; www.theregister.com.

* cited by examiner

INTELLIGENT ASYMMETRIC SERVICE DENIAL SYSTEM FOR MOBILE CELLULAR DEVICES AND ASSOCIATED METHODS

FIELD OF THE INVENTION

The present invention relates to the field of wireless communications, and, more particularly, to control of wireless cellular devices within a physical area and related methods.

BACKGROUND OF THE INVENTION

Cellular telephones and other mobile wireless communication devices including PDAs, pagers and wireless email devices are everywhere. Unfortunately, such devices can be mis-used in a manner, for example, to remote control another device in a public place, such as on a bus, train or airplane. There is considerable disagreement on how to balance the conflict between public safety and the convenience of using such mobile communication devices.

The C-Guard LP, by Netline Communications Technologies (NCT) Ltd. of Tel Aviv, Israel, is a low power (LP) jamming device for mobile communications. The LP cell phone jammer unit is intended for blocking all mobile phone types within designated indoor areas. It combines jamming in a radius between 5-80 meters (depending on cellular signal strength at site) and strict compliance with international standards of safety and electromagnetic compatibility. Once the C-Guard cellular jammer is operating, all mobile phones present within the jamming coverage area are blocked, and cellular activity in the immediate surroundings (including incoming and outgoing calls, SMS, pictures sending, etc.) is jammed. Jamming, the act of intentionally directing electromagnetic energy at a communication system to interfere with signal transmission and/or reception, is illegal in many places including the United States of America.

The Defense Advanced Research Projects Agency (DARPA) has developed a jamming system called "Wolfpack" that can be dropped into a conflict zone and can deny use of some communication systems while not interfering with friendly communications.

Furthermore, Cell Block Technologies, Inc. of Fairfax, Va. makes products that provide mobile phone privacy by creating wireless communications-free zones or areas. The Quiet Cell silencing products can detect and control the use of mobile phones within a restricted area e.g. in churches, schools or embassies. Specifically, the product redirects incoming calls to voicemail and blocks outgoing calls.

Iceberg Systems of the United Kingdom makes a system including a security station that may broadcast and inhibiting or disabling signal in a prohibited zone to disable audio or image recording capabilities of a portable device such as a camera phone. The portable device may also be disabled. Such a system and method is described in the published document WO2004089021.

U.S. Pat. No. 6,907,254 to Westfield is directed to a method and apparatus for controlling a quiet zone for wireless units in an IP-based cellular wireless communication system. Entry of a cellular phone device into an area of restricted phone access ("quiet zone") is detected and an IP message identifying the phone is sent to a central facility. In one embodiment, an IP message is sent to the phone causing it to change behavior, for example turning off the volume on the ringer. Alternatively, the central facility can process an incoming call for a phone that is determined to be in a quiet zone to reduce intrusion in the quiet zone; for example, it can send the call to a phone mailbox or give the caller a busy signal. Such a quiet zone may be in a restaurant or theater.

None of the above described approaches can prevent reception of calls to a mobile device within a relatively small area or zone, with minimal inconvenience to the public by also permitting outgoing transmissions. Accordingly, there is a need for such a system and method.

SUMMARY OF THE INVENTION

In view of the foregoing background, it is therefore an object of the present invention to provide a system and method to prevent reception of calls to a mobile device within a relatively small area or zone, with minimal inconvenience to the public by also permitting outgoing transmissions.

This and other objects, features, and advantages in accordance with the present invention are provided by a selective call blocker for one or more mobile cellular devices in a desired zone and otherwise capable of an inbound call or an outbound call with at least one cellular base station. The mobile cellular device having at least one wirelessly settable parameter associated therewith enabling establishment of an inbound call. The selective call blocker includes a receiver, a transmitter, and a selective call blocking controller cooperating with the receiver to determine the at least one wirelessly settable parameter associated with the mobile cellular device enabling establishment of an inbound call. The selective call blocking controller also cooperates with the transmitter to wirelessly change the wirelessly settable parameter to selectively block an inbound call to the mobile cellular device and without defeating the capability of the mobile cellular device to establish an outbound call.

An additional transmitter may be associated with the receiver to define an uplink relay transceiver, and an additional receiver may be associated with the transmitter to define a downlink relay transceiver. The selective call blocking controller may cooperate with the uplink and downlink relay transceivers to relay an outbound call from the mobile cellular device. Also, a directional antenna may be associated with the downlink relay transceiver. The directional antenna may be a horn or a patch antenna, for example, having a radiation pattern that does not substantially interfere with signals outside the desired zone, e.g. a pattern with a wide angle and relatively low sidelobes.

However, a radiation pattern with a wide angle with low sidelobes is not required in the antenna system. A desirable characteristic is that the radiation pattern of the selective call blocker be controlled so that low side lobes occur outside the protected volume to limit external interference. As a practical matter, wide angle coverage is desirable to limit the number of apertures needed to cover a given area.

Furthermore, the wirelessly settable parameter may be a frequency, a power level, and/or a coding parameter, for example. The desired zone may be a vehicle compartment or a geographically stationary zone, for example. The transmitter preferably may have a desired power to provide a power advantage within the desired zone over the at least one cellular base station.

A method aspect of the invention is directed to selectively blocking calls for a mobile cellular device in a desired zone and otherwise capable of an inbound call or an outbound call with at least one cellular base station. Again, the mobile cellular device has a wirelessly settable parameter associated therewith enabling establishment of an inbound call. The method includes determining the wirelessly settable parameter associated with the at least one mobile cellular device, and wirelessly changing the parameter to selectively block an inbound call to the at least one mobile cellular device and without defeating the capability of the at least one mobile cellular device to establish an outbound call.

An outbound call from the at least one mobile cellular device is preferably relayed to the cellular base station. Changing the parameter may include operating a directional antenna associated with a downlink relay transceiver and preferably with a desired power to provide a power advantage within the desired zone over the at least one cellular base station.

DETAILED DESCRIPTION OF THE PREFERRED EMBODIMENTS

Figure 1:
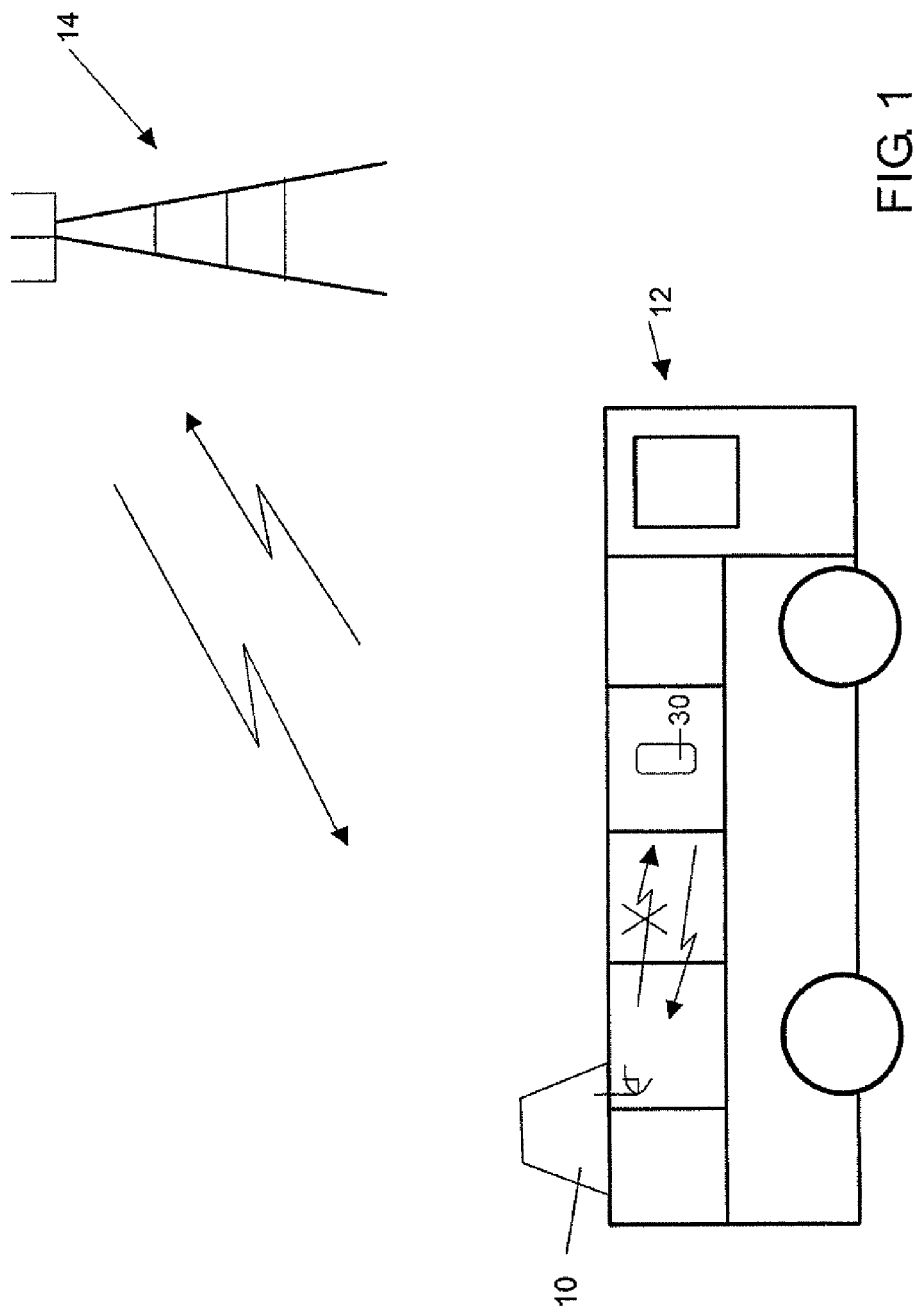
FIG. 1 is a diagram illustrating an embodiment of the selective call blocker in accordance with the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Cellular radio provides mobile telephone service by using a network of cell sites distributed over a wide area. A cell site contains a radio transceiver and a base station controller which manages, sends, and receives traffic from the mobiles in its geographical area to a cellular telephone switch. It also uses a tower and its antennas, and provides a link to the distant cellular switch called a mobile telecommunications switching office (MTSO). This MTSO places calls from land based telephones to wireless customers, switches calls between cells as mobiles travel across cell boundaries, and authenticates wireless customers before they make calls.

So each cell site has a base station with a transceiver and an antenna. This radio equipment provides coverage for an area that's usually two to ten miles in radius. Even smaller cell sites cover tunnels, subways and specific roadways. The area size depends on, among other things, topography, population, and traffic.

In cellular radio, including analog cellular, digital cellular, and PCS, frequency is a single unit whereas channel means a pair of frequencies, one to transmit on and one to receive. Path, channel, and frequency all constitute a communication link. In cellular, path describes the direction in which information flows. The forward path denotes information flowing from the base station to the mobile device. The reverse path describes information flowing from the mobile device to the base station. Frequency and channel refer to the physical medium which carries a signal, while path refers to the direction a signal is going on that medium.

A call gets set up on the control channel and another channel actually carries the conversation. Registration begins when you turn on your phone. It only takes a few hundred milliseconds. Registration lets the local system know that a phone is active, in a particular area, and that the mobile device can now take incoming calls. A mobile phone runs a self diagnostic when it's powered up. Once completed it acts like a scanning radio. Searching through its list of forward control channels, it picks one with the strongest signal, i.e. the nearest cell. The mobile device re-scans every few seconds or when signal strength drops below a pre-determined level. After selecting a channel the phone then identifies itself on the reverse control path. The mobile device sends its phone number, its electronic serial number, and its home system ID. Among other things. The cell site relays this information to the mobile telecommunications switching office (MTSO) which in turn, communicates with different databases, switching centers and software programs.

The local system registers the phone if everything checks out. The mobile device can now take incoming calls since the system is aware that it is in use. Registration is an ongoing process. Moving from one service area to another causes registration to begin again. Just waiting ten or fifteen minutes does the same thing. It's an automatic activity of the system. It updates the status of the waiting phone to let the system know what is going on. The cell site can initiate registration on its own by sending a signal to the mobile. That forces the unit to transmit and identify itself.

Different transmission techniques enable the different cellular radio systems. These technologies are the infrastructure of radio. In frequency division multiple access, we separate radio channels or calls by frequency, like the way broadcast radio stations are separated by frequency. One call per channel. In time division multiple access we separate calls by time, one after another. Since calls are separated by time TDMA can put several calls on one channel. In code division multiple access calls are separated by code, putting all the calls on a single channel. These codes are so specific that dozens of users can transmit simultaneously on the same frequency without interference to each other. Every cell site can transmit on every frequency available to the wireline or non-wireline carrier.

For additional basic cellular background, reference is made to "Cellular Telephone Basics: AMPS and Beyond" by Tom Farley and Mark van der Hoek (www.privateline.com).

The present invention is described below with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

Figure 2:
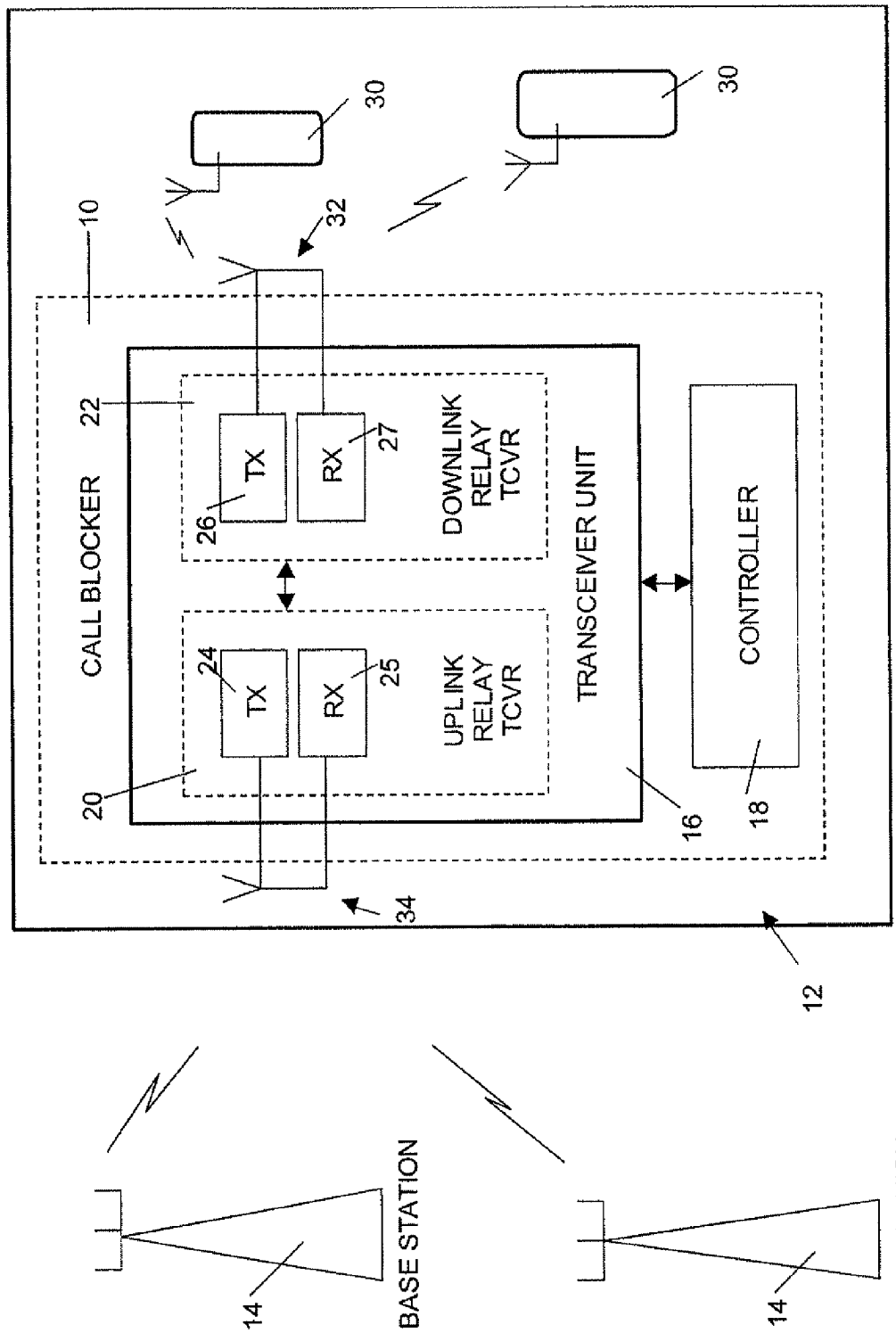
FIG. 2 is a more detailed schematic diagram of the selective call blocker of FIG. 1.

Referring initially to FIGS. 1 and 2, a selective call blocker 10 will now be described. The selective call blocker 10 is a programmable intelligent relay and may be operated within a desired zone 12 or compartment or vehicle (e.g. a bus) and acts as a mobile base station. The desired zone 12 may be a vehicle compartment or a geographically stationary zone, for example. The call blocker 10 defines a small cell or pico cell within one or more cellular networks. The call blocker 10 operates to control one or more mobile communication or cellular devices 30 in the desired zone 12 and otherwise capable of an inbound call or an outbound call with at least one cellular base station 14.

Such a mobile communications device 30 may be a handheld radio, cell phone or wireless email device, for example, including a portable housing, battery, transceiver, processor and antenna, as would be appreciated by those skilled in the art. Such a mobile communications device 30 may be operating on any of various communication networks such as Global System for Mobile (GSM), TDMA, CDMA etc. or any IP-based cellular system, for example.

The pico-cell is defined in a manner to prevent interference with mobile transmit/receive devices outside the protected volume (e.g. a bus, plane, small geographic area). Devices in the unprotected area will follow normal call processing procedures. Further, when transitioning from the desired zone 12 (i.e. pico-cell) to the unprotected area, it is expected that the mobile device 30 or phone will use standard call processing techniques (e.g. frequency scan) to re-establish call connectivity with a geographically accessible base station. Conversely when entering the pico-cell, the mobile device 30 will be exploited to drop the call from the current base station and relay through the selective call blocker 10, until the mobile device 30 is outside the desired zone 12.

In these systems, cell phones and base stations transmit or communicate with each other on dedicated paired frequencies called channels. Base stations use one frequency of that channel and mobiles use the other. Certain channels carry only cellular system data. This control channel responsible for call setup, and is also referred to as a setup channel. Voice channels, by comparison, are those paired frequencies which handle traffic, such as voice or data, as well as signaling information about the call itself.

The base station's transmitting frequency is the forward path. The cell phone's transmitting frequency is called the reverse path. So, there are two channels for every call with four frequencies involved, and a forward and reverse path for each frequency. Again, a frequency is the medium upon which information travels. A path is the direction the information flows.

The mobile cellular device 30 has at least one wirelessly settable parameter associated therewith enabling establishment of an inbound call. For example, such a settable parameter may be a frequency, a power level such as automatic gain control (AGC) or transmit/receive power, and/or a coding parameter such as a spreading code for a CDMA system.

The selective call blocker 10 includes a receiver 25, a transmitter 26, and a selective call blocking controller 18 cooperating with the receiver to determine the at least one wirelessly settable parameter associated with the mobile cellular device enabling establishment of an inbound call. In other words, the controller 18 is monitoring characteristics of the base station(s) 14 and cell that it is currently operating in to determine the type of communication systems being operated in the area. The selective call blocking controller 18 also cooperates with the transmitter 26 to wirelessly change the wirelessly settable parameter in the mobile communications device 30 to selectively block an inbound call to the mobile cellular device and without defeating the capability of the mobile cellular device to establish an outbound call.

For example, the controller 18 may transmit, via transmitter 26, various control signals over a forward control channel to set the mobile communications device 30 on a frequency that is not being used by the geographically accessible base station(s) 14. Similarly, in a CDMA system, the controller 18 may set the mobile communications device 30 to a code not being used by the geographically accessible base station(s) 14. A power level such as automatic gain control (AGC) or transmit/receive power of the mobile communications device 30 may also be set so that the device can only communicate with the call blocker 10 and not directly to the geographically accessible base station(s) 14. Therefore, incoming calls from base station 14 could not be connected with mobile communications device 30 operating within the zone 12. However, the call blocker 10 acts as a relay to forward outbound calls from the mobile communications device 30 to the base station(s) 14. This is by virtue of setting the wireless parameter in the mobile device to arbitrate the call blocker as the preferred "base station" for all voice and/or data traffic from the mobile device. Although it may be somewhat more complicated, the call blocker 10 could also allow outbound calls directly from the mobile communications device 30 to the base station(s) 14.

An additional transmitter 24 may be associated with the receiver 25 to define an uplink relay transceiver 20, and an additional receiver 27 may be associated with the transmitter 26 to define a downlink relay transceiver 22. The uplink relay transceiver 20 also includes an antenna 34 for external communications. The selective call blocking controller 18 may cooperate with the uplink and downlink relay transceivers 20/22 which define a transceiver unit 16 to relay an outbound call from the mobile cellular device 30.

The downlink relay transceiver 22 includes one or more antennas 32 for communications within the zone 12. The antenna 32 is preferably a directional antenna and may be a horn or a patch antenna, for example, having a radiation pattern with a wide angle and relatively low sidelobes. The transmitter 26 and directional antenna(s) 32 are operated with a desired power to provide a power advantage within the desired zone 12 over the nearest cellular base station 14, e.g. 15 dB.

The desired zone 12 or protective pico-cell will also aid the establishment and registration of newly powered mobile communications devices 30. The controller 18 in connection with the transceiver unit 16 of the selective call blocker 10 will scan the desired zone 12 or protected volume for new mobiles 30 and establish them through the call blocker into the standard external mobile infrastructure, but in a manner that the mobile device can only be accessed from the existing infrastructure through the selective call blocker 10.

As mentioned above, a radiation pattern with a wide angle with low sidelobes is not required in the antenna system. A desirable characteristic is that the radiation pattern of the selective call blocker be controlled so that low side lobes occur outside the protected volume to limit external interference. As a practical matter, wide angle coverage is desirable to limit the number of apertures needed to cover a given area.

Figure 3:
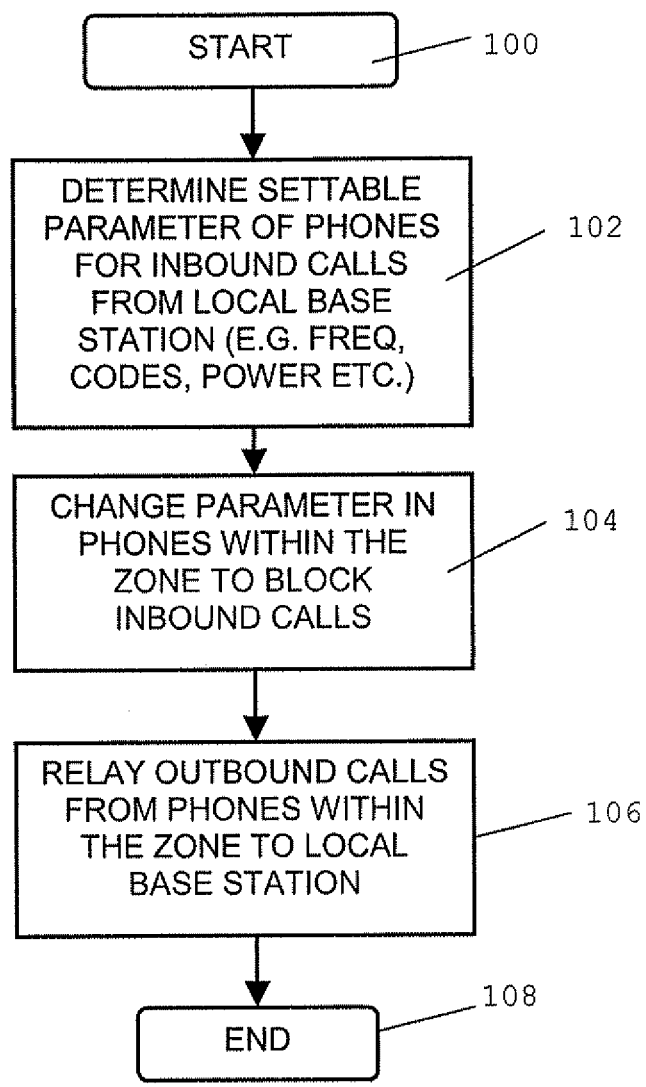
FIG. 3 is a flowchart illustrating the steps of a method in accordance with the present invention.

A method aspect of the invention will be discussed with reference to the flowchart of FIG. 3. The method is directed to selectively blocking calls for a mobile cellular device 30 in a desired zone 12 and otherwise capable of an inbound call or an outbound call with at least one cellular base station 14. Again, the mobile cellular device 30 has a wirelessly settable parameter associated therewith enabling establishment of an inbound call. The method begins (block 100) and includes determining the wirelessly settable parameter associated with the at least one mobile cellular device 30 (block 102), and wirelessly changing the parameter to selectively block an inbound call to the at least one mobile cellular device and without defeating the capability of the at least one mobile cellular device to establish an outbound call (block 104).

At block 106, an outbound call from the at least one mobile cellular device 30 is preferably relayed to the cellular base station 14. Changing the parameter may include operating a directional antenna 32 associated with a downlink relay transceiver 22 and preferably with a desired power to provide a power advantage within the desired zone 12 over the at least one cellular base station 14.

So, a pico-cell (or relatively small cell in the cellular network) is created within the volume (e.g. a bus) to be protected using directional antennas to control radiation pattern. The pico-cell is defined in a manner to prevent interference with mobile transmit/receive devices outside the protected volume (e.g. a bus, plane, small geographic area). Devices in the unprotected area will follow normal call processing procedures. Further, when transitioning from the desired zone 12 (i.e. pico-cell) to the unprotected area, it is expected that the mobile device 30 or phone will use standard call processing techniques (e.g. frequency scan) to re-establish call connectivity with a geographically accessible base station. Conversely when entering the pico-cell, the mobile device 30 will be exploited to drop the call from the current base station and relay through the selective call blocker 10, until the mobile device 30 is outside the desired zone 12.

Asymmetric call flow, allows "out calls" but no "in calls". All phone calls are attracted to the selective call blocker 10 which acts as a mobile base station/router or relay waiting to initiate/receive calls. The selective call blocker 10 allows outgoing calls to be sent to base station 14 and denies all incoming calls. Additionally, only certain outgoing calls (e.g. emergency 911 calls, etc.) may be allowed or relayed to the base station 14.

The directivity of the controlled volume is such that mobile devices close-by can still operate as desired. The denial of service moves with item to be protected, so the system is not a broad area system and does not require special handling by the cell network. Selective relay properties (i.e. power, or frequencies etc.) may be adapted when traversing cells and/or networks, and the system would be capable of operating all cell systems simultaneously—CDMA, TDMA, GSM, IS-95 etc. The system could be switched on for various reasons, e.g. an increased threat level.

The call blocker 10 or intelligent relay can also be a design feature of a network where the mobile nodes include cooperatively controlled compliance, for example, in a silent zone. The term "call" refers to any communication or message transmitted and/or received over an established set-up, voice or data channel.

For dynamic operation, the selective call blocker 10, via the controller 18 and transceiver unit 16, will periodically scan the electro-magnetic environment outside the protected volume for the cellular technologies (e.g. CDMA, GSM, TDMA, IS-95, IS-136) and cell characteristics (e.g. power levels, frequency re-use group, code reuse group) for the purpose of maintaining the call blocker 10 as the preferred base station for the possible variety of mobile communications operating within the protective volume as the volume moves (e.g. traverses a city).

The scan period can be set by a number of factors, but the overriding consideration is to revisit the external signal environment at a rate faster than any mobile device 30 can complete the dial-up process to receive a call and also at a rate fast enough to maintain the current status of the cell characteristics through which the volume maybe moving (e.g. for slower vehicles moving at 1-2 miles per hour, for example, the scan process may be at a lower rate than on vehicles traveling at higher rates of speed, e.g. above 60 miles per hour).

The selective call blocker 10 will then adaptively in real-time adjust its operating characteristics and those of the controlled mobile devices 30 such that the call blocker maintains its preferred status for the mobiles within the protected volume 12 and the call blocker system experiences the "handovers" typical of normal cellular system operation to avoid dropped outgoing calls. The selective call blocker 10 may also or alternatively use GPS or GSP-like position information, as well as, "coverage maps" of the cellular systems within a geographic area for the protected volume 12 to have a predetermined set-up strategy for the pico-cell characteristics to maintain control of the protected volume.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A selective call blocker for at least one mobile cellular device in a desired zone and otherwise capable of an inbound call or an outbound call with at least one cellular base station, the at least one mobile cellular device having at least one wirelessly settable parameter therein enabling establishment of an inbound call, the at least one wirelessly settable parameter comprising at least one of a frequency, a power level, and a coding parameter, the selective call blocker comprising:
   a receiver;
   a transmitter; and
   a selective call blocking controller cooperating with said receiver to determine the at least one wirelessly settable parameter of the at least one mobile cellular device enabling establishment of an inbound call, and said selective call blocking controller cooperating with said transmitter to wirelessly change the at least one wirelessly settable parameter in the at least one mobile cellular device to selectively block an inbound call to the at least one mobile cellular device and without defeating the capability of the at least one mobile cellular device to establish an outbound call and thereby designate the selective call blocker as a preferred base station for all traffic to and from the at least one mobile cellular device.

2. The selective call blocker according to claim 1 further comprising:
   an additional transmitter associated with said receiver to define an uplink relay transceiver; and
   an additional receiver associated with said transmitter to define a downlink relay transceiver.

3. The selective call blocker according to claim 2 wherein said selective call blocking controller cooperates with said uplink and downlink relay transceivers to relay an outbound call from the at least one mobile cellular device to the at least one cellular base station.

4. The selective call blocker according to claim 2 wherein said selective call blocking controller cooperates with said uplink and downlink relay transceivers to provide a handover of the at least one mobile cellular device to the selective call blocker from the at least one cellular base station, when the at least one mobile cellular device enters the desired zone.

5. The selective call blocker according to claim 2 further comprising a directional antenna associated with said downlink relay transceiver.

6. The selective call blocker according to claim 5 wherein the directional antenna comprises at least one of a horn and a patch antenna having a radiation pattern that does not substantially interfere with signals outside the desired zone.

7. The selective call blocker according to claim 1 wherein the selective call blocking controller cooperates with said receiver and transmitter to detect wireless system characteristics outside the desired zone.

8. The selective call blocker according to claim 7 wherein the desired zone comprises a mobile compartment, and the selective call blocking controller detects wireless system characteristics outside the desired zone at a scan rate that is based upon movement of the mobile compartment.

9. The selective call blocker according to claim 1 wherein the desired zone comprises a vehicle compartment.

10. The selective call blocker according to claim 1 wherein the desired zone comprises a geographically stationary zone.

11. The selective call blocker according to claim 1 wherein said transmitter has a desired power to provide a power advantage within the desired zone over the at least one cellular base station.

12. A selective call blocker for at least one mobile cellular device in a desired zone and otherwise capable of an inbound call or an outbound call with at least one cellular base station, the at least one mobile cellular device having at least one wirelessly settable parameter therein enabling establishment of an inbound call, the at least one wirelessly settable parameter comprising at least one of a frequency, a power level, and a coding parameter, the selective call blocker comprising:
 a transceiver unit; and
 a selective call blocking controller cooperating with said transceiver unit to determine the at least one wirelessly settable parameter of the at least one mobile cellular device enabling establishment of an inbound call, to wirelessly change the at least one wirelessly settable parameter in the at least one mobile cellular device to selectively block an inbound call to the at least one mobile cellular device, and to relay an outbound call from the at least one mobile cellular device to the at least one cellular base station and thereby designate the selective call blocker as a preferred base station for all traffic to and from the at least one mobile cellular device.

13. The selective call blocker according to claim 12 further comprising a directional antenna associated with said transceiver unit.

14. The selective call blocker according to claim 12 wherein the desired zone comprises a vehicle compartment.

15. The selective call blocker according to claim 12 wherein said transceiver unit has a desired power to provide a power advantage within the desired zone over the at least one cellular base station.

16. A method for selectively blocking calls for at least one mobile cellular device in a desired zone and otherwise capable of an inbound call or an outbound call with at least one cellular base station, the at least one mobile cellular device having at least one wirelessly settable parameter therein enabling establishment of an inbound call, the at least one wirelessly settable parameter comprising at least one of a frequency, a power level, and a coding parameter, the method comprising:
 determining the at least one wirelessly settable parameter of the at least one mobile cellular device enabling establishment of an inbound call; and
 wirelessly changing the at least one wirelessly settable parameter in the at least one mobile cellular device to selectively block an inbound call from the at least one cellular base station to the at least one mobile cellular device and without defeating the capability of the at least one mobile cellular device to establish an outbound call and thereby selectively regulate all traffic to and from the at least one mobile cellular device.

17. The method according to claim 16 further comprising relaying an outbound call from the at least one mobile cellular device to the at least one cellular base station.

18. The method according to claim 16 wherein wirelessly changing comprises operating a directional antenna associated with a downlink relay transceiver.

19. The method according to claim 18 wherein operating comprises operating the directional antenna and downlink relay transceiver with a desired power to provide a power advantage within the desired zone over the at least one cellular base station.

20. The method according to claim 16 wherein the desired zone comprises a vehicle compartment.

* * * * *